(12) United States Patent
Tan et al.

(10) Patent No.: US 7,619,323 B2
(45) Date of Patent: Nov. 17, 2009

(54) UNINTERRUPTIBLE POWER SUPPLY CAPABLE OF PROVIDING SINUSOIDAL-WAVE OUTPUT AC VOLTAGE

(75) Inventors: Jingtao Tan, Shanghai (CN); Changzan Ma, Shanghai (CN); Weimin Wu, Shanghai (CN); Zhiqiang Jiang, Shanghai (CN); Jianping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 61 days.

(21) Appl. No.: 11/554,400

(22) Filed: Oct. 30, 2006

(65) Prior Publication Data
US 2007/0247004 A1    Oct. 25, 2007

(30) Foreign Application Priority Data
Apr. 21, 2006 (TW) ................................ 95114475 A

(51) Int. Cl.
*H02J 1/00* (2006.01)
(52) U.S. Cl. ....................................................... 307/82
(58) Field of Classification Search ................... 307/64, 307/82
See application file for complete search history.

(56) References Cited

U.S. PATENT DOCUMENTS

| 6,094,363 | A  | * | 7/2000  | Cheng ........................ 363/26 |
| 6,151,234 | A  | * | 11/2000 | Oldenkamp ................. 363/132 |
| 6,184,593 | B1 | * | 2/2001  | Jungreis ..................... 307/64 |
| 7,054,175 | B2 | * | 5/2006  | Kurio et al. .................. 363/65 |
| 2004/0017110 | A1 | * | 1/2004 | Yim ............................ 307/23 |

* cited by examiner

*Primary Examiner*—Albert W Paladini
*Assistant Examiner*—Michael Rutland Wallis

(57) ABSTRACT

Provided is an uninterruptible power supply for providing a sinusoidal-wave output AC voltage. The uninterruptible power supply is advantageous in terms of a DC/DC converter unit consisted of a plurality of DC/DC converter, in which the input terminals of the DC/DC converters are connected in parallel with each other and the output terminals of the DC/DC converters are connected in series with each other. The output DC voltages of the DC/DC converters are configured to sum up to form a full-wave rectified DC voltage, which can be converted into a sinusoidal-wave output AC voltage by an inverter. Furthermore, the uninterruptible power supply provides an energy recycle converter configured for recycling the redundant energy of the uninterruptible power supply to charge a battery pack.

10 Claims, 8 Drawing Sheets

UNINTERRUPTIBLE POWER SUPPLY CAPABLE OF PROVIDING SINUSOIDAL-WAVE OUTPUT AC VOLTAGE

FIELD OF THE INVENTION

The present invention is related to an uninterruptible power supply, and more particularly to an uninterruptible power supply capable of providing a sinusoidal-wave output AC voltage.

BACKGROUND OF THE INVENTION

With the burgeoning expansion of the information technology and the high-tech industry, uninterruptible power supply (or UPS) has been widely used as an emergent power supply device for a variety of electronic devices. Most of the sophisticated electronic instruments and communication equipment rely on high-quality power supply to maintain normal operations. Contemporarily, UPS has served as an optimum solution to ensure the best power supply quality under the blackout condition.

FIG. 1 is a systematic block diagram partially showing the construction of an uninterruptible power supply, in which the uninterruptible power supply is operating under the condition that the commercial power source is abnormal or interrupted. When the commercial power source is abnormal or interrupted, the DC/DC converter 21 is configured to convert the DC voltage provided by the battery pack 23 into a boosted DC voltage, and the inverter 22 is configured to convert the boosted DC voltage into an output AC voltage for use by a load (not shown). In general, the output AC voltage is a square-wave AC voltage, which would cause damages to an inductive load, such as transformer or electromotor. Therefore, a high-level uninterruptible power supply usually has to provide a sinusoidal-wave output AC voltage to ensure the normal operation for a load when the commercial power supply is abnormal or interrupted. However, if it is desired to enable an uninterruptible power supply to output a sinusoidal-wave output AC voltage, the uninterruptible power supply has to be designed with a complicated circuit construction, which implies the increase of the cost of the uninterruptible power supply. In the meantime, complicated circuit construction would aggravate the power loss of the uninterruptible power supply.

It is therefore a tendency to improve the circuit design of the conventional uninterruptible power supply to enable the uninterruptible power supply to provide a sinusoidal-wave output AC voltage with a simplified circuit construction.

SUMMARY OF THE INVENTION

An object of the present invention is to provide an uninterruptible power supply for providing a sinusoidal-wave output AC voltage when the commercial power source is abnormal or interrupted.

Another object of the present invention is to provide an uninterruptible power supply for providing a sinusoidal-wave output AC voltage with a simplified circuit construction and improved power conversion efficiency.

A major aspect of the present invention provides an uninterruptible power supply, including a battery pack, a DC/DC converter unit coupled to the battery pack and configured to convert a DC voltage provided by the battery pack into a full-wave rectified DC voltage, and an inverter coupled to the DC/DC converter unit and configured to convert the full-wave rectified DC voltage into a sinusoidal-wave output AC voltage, in which the DC/DC converter unit includes a plurality of DC/DC converters. The input terminals of the DC/DC converters are connected in parallel and then connected to the battery pack, and the output terminals of the DC/DC converters are connected in series and then connected to the inverter. Each DC/DC converter is configured to convert the DC voltage provided by the battery pack into an output voltage, and the output voltages of the DC/DC converters are summed up to form the full-wave rectified DC voltage.

A minor aspect of the present invention provides a method for enabling an uninterruptible power supply to provide a sinusoidal-wave output AC voltage. The method includes the steps of: providing a battery pack, a DC/DC converter unit and an inverter, in which the DC/DC converter unit includes a plurality of DC/DC converters. Next, a battery voltage is provided to the DC/DC converter unit through the battery pack. Next, the battery voltage is converted by the DC/DC converters into a plurality of output voltages. Next, the output voltages are summed up into a full-wave rectified DC voltage, and then the full-wave rectified DC voltage is converted by the inverter into a sinusoidal-wave output AC voltage.

Now the foregoing and other features and advantages of the present invention will be best understood through the following descriptions with reference to the accompanying drawings, wherein:

DETAILED DESCRIPTION OF THE PREFERRED EMBODIMENT

Several preferred embodiments embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 1:
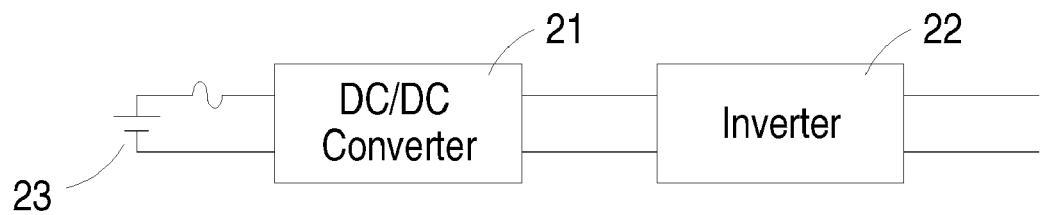
FIG. 1 is a systematic block diagram partially showing a conventional uninterruptible power supply.
Figure 2:
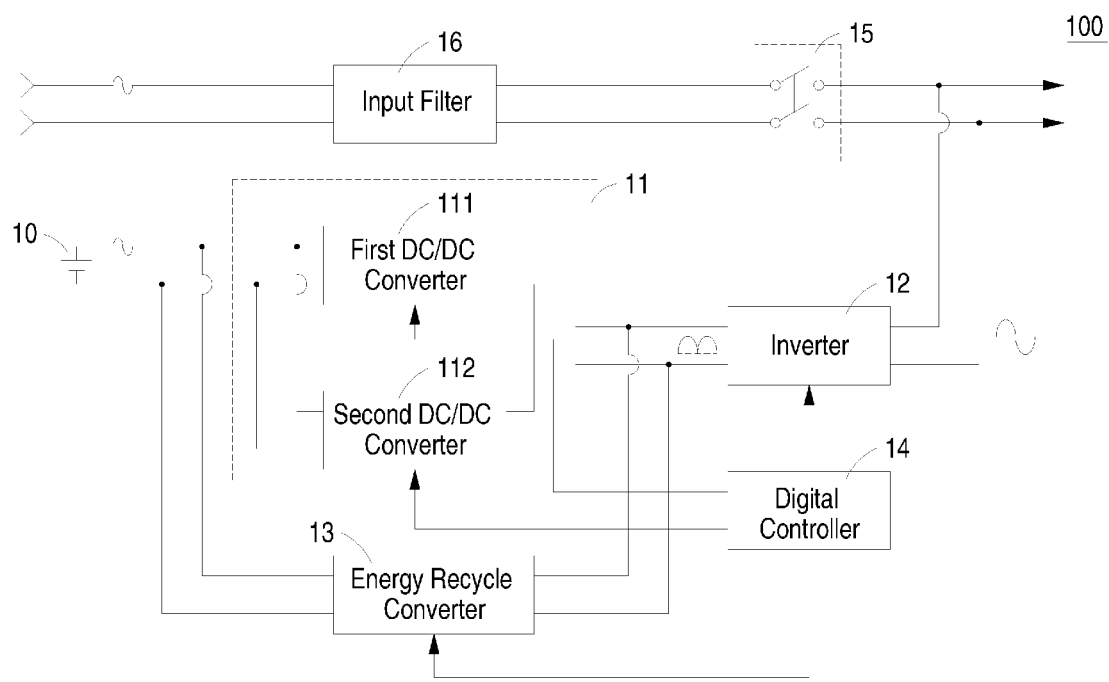
FIG. 2 is a systematic block diagram showing an uninterruptible power supply according to the present invention.

The system construction of the uninterruptible power supply according to the present invention is illustrated in FIG. 2. As shown in FIG. 2, the inventive uninterruptible power supply 100 includes an input filter 16, a relay 15, a battery pack 10, a DC/DC converter unit 11, an inverter 12, a digital controller 14, and an energy recycle converter 13. The input filter 16 is configured to suppress the electromagnetic interference caused by an input AC voltage supplied from a commercial power supply and suppress the interference caused by the uninterruptible power supply. The relay 15 is coupled to the output terminal of the input filter 16, and configured to be controlled by the digital controller 14 so as to close for delivering the input AC voltage to a load when the input AC voltage is normal and open for enabling the inverter 12 to supply the required power to the load when the input AC voltage is abnormal or interrupted. The battery pack 10 is configured to store energy when the input AC voltage is normal and release the stored energy when the input AC voltage is abnormal or interrupted. The DC/DC converter unit 11 includes a plurality of DC/DC converters and coupled to the battery pack 10 and configured to receive the current outputted from the battery pack 10, thereby converting the DC voltage provided by the battery pack 10 into a full-wave rectified DC voltage. The inverter 12 is coupled to the output terminal of the DC/DC converter unit 11 and configured to convert the full-wave rectified DC voltage outputted from the DC/DC converter unit 11 into a sinusoidal-wave output AC voltage. The energy recycle converter 13 is coupled to the input terminal of the inverter 12 and configured to recycle the redundant energy of the uninterruptible power supply 100 to the battery pack 10. The digital controller 14 is configured to control the on/off operations of the relay 15, and control the on/off operations of the internal switches of the DC/DC converter unit 11, the inverter 12, and the energy recycle converter 13. It is to be noted that the same reference numeral denotes the same circuit element throughout the present invention.

Figure 3:
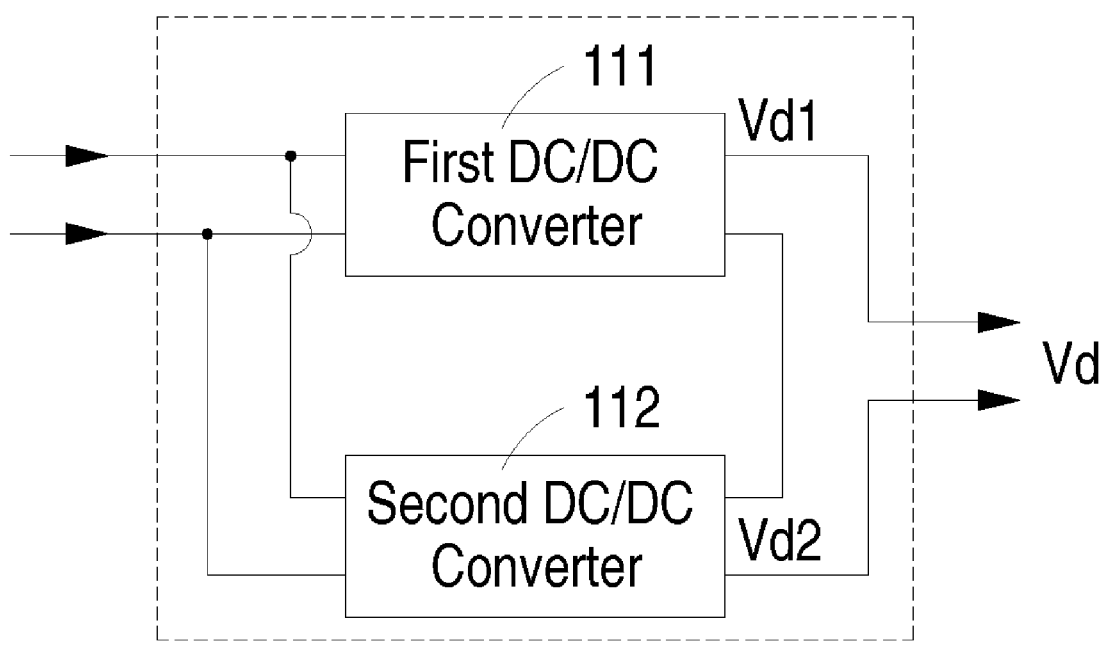
FIG. 3 shows the topology of the DC/DC converter unit within the uninterruptible power supply according to the present invention.

FIG. 3 shows the circuit construction of the DC/DC converter unit 11. As shown in FIG. 3, the DC/DC converter unit 11 of the present invention includes a first DC/DC converter 111 and a second DC/DC converter 112, in which the voltage input terminal of the first DC/DC converter 111 and the voltage input terminal of the second DC/DC converter 112 are connected in parallel and then connected to the battery pack 10, and the voltage output terminal of the first DC/DC converter 111 and the voltage output terminal of the second DC/DC converter 112 are connected in series and then connected to the input terminal of the inverter 12. The first DC/DC converter 111 is configured to receive a DC voltage outputted from the battery pack 10 shown in FIG. 2 and convert the received DC voltage into a first output DC voltage Vd1. The second DC/DC converter 112 is configured to receive a DC voltage outputted from the battery pack 10 shown in FIG. 2 and convert the received DC voltage into a second output DC voltage Vd2. The first output DC voltage Vd1 of the first DC/DC converter 111 and the second output DC voltage Vd2 of the second DC/DC converter 112 are configured to be summed up at the output terminal of the DC/DC converter unit 11, and their sum is a full-wave rectified DC voltage Vd.

Figure 4:
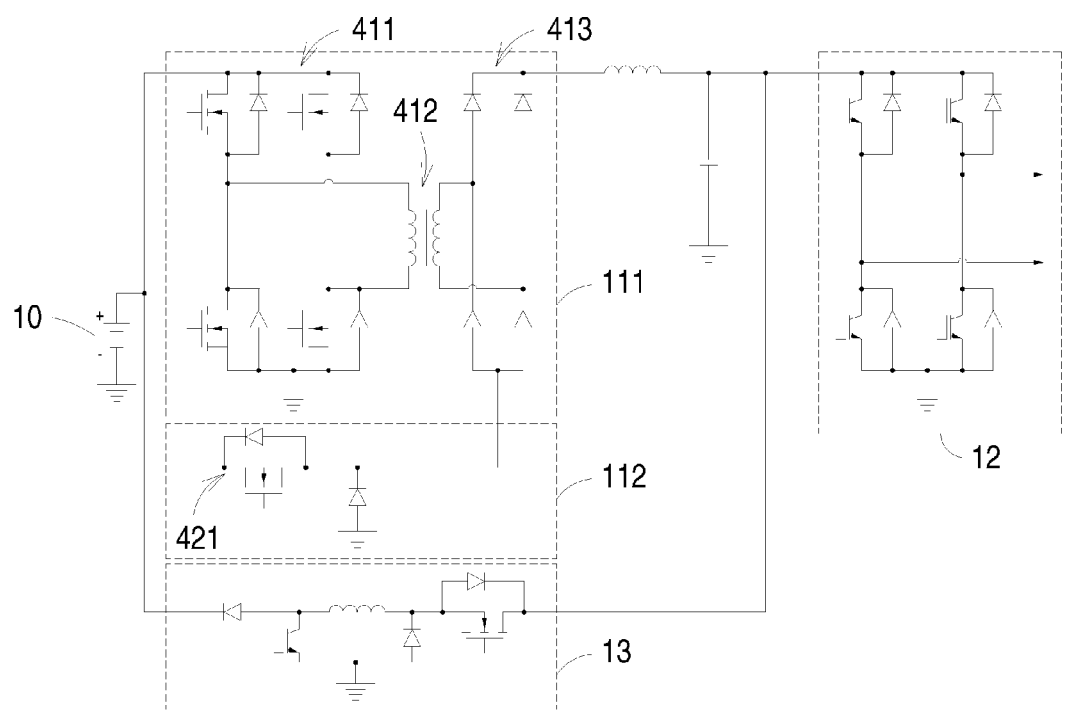
FIG. 4 is a circuit diagram showing the DC/DC converter unit, the inverter, and the energy recycle converter within the uninterruptible power supply according to a first preferred embodiment of the present invention.

FIG. 4 shows the circuit diagram of the DC/DC converter unit, the inverter, and the energy recycle converter within the uninterruptible power supply according to a first preferred embodiment of the present invention. As shown in FIG. 4, the first DC/DC converter 111 is a current-fed full-bridge DC/DC converter including a switch device 411, a high-frequency transformer 412 and a rectifying circuit 413. In FIG. 4, the first DC/DC converter 111 is configured to receive a DC voltage outputted from the battery pack 10 and convert the DC voltage received from the battery pack 10 into a square-wave AC voltage by the repeated on/off operations of the switch device 411. The square-wave AC voltage is converted into an AC voltage having a desired voltage level by the high-frequency transformer 412, and the AC voltage outputted from the high-frequency transformer 412 is converted into a first output DC voltage Vd1 by the rectifying circuit 413. The second DC/DC converter 112 is a buck converter (or step-down converter), which is configured to lower the DC voltage outputted from the battery pack 10 down to a second output DC voltage Vd2 by the switch device 421. The on/off operations of the switch device 411 and the switch device 421 are controlled by the digital controller 14 shown in FIG. 2.

The most conspicuous feature of the inventive uninterruptible power supply is based on the theory that the DC/DC converter unit 11 is made up of a plurality of DC/DC converters 111 and 112 and each DC/DC converter is configured to contribute to the output DC voltage Vd of the DC/DC converter unit 11. By connecting the output terminals of the DC/DC converters 111 and 112 in series, the output DC voltages of the DC/DC converters 111 and 112 can be combined to form a full-wave rectified DC voltage. Thus, the inverter 12 can convert the full-wave rectified DC voltage outputted from the DC/DC converter unit 11 into a sinusoidal-wave AC voltage for output.

Figure 8A:
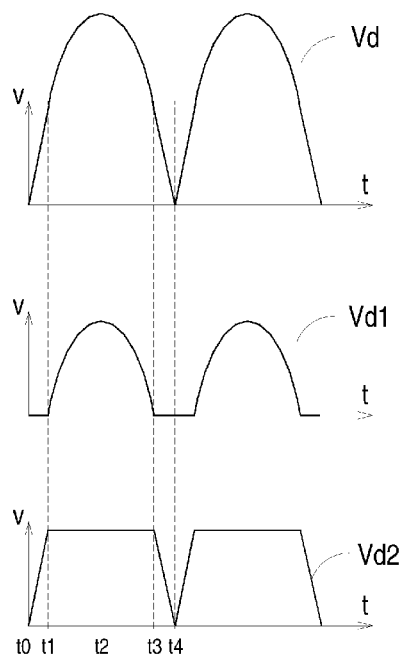
FIG. 8(A) is a timing diagram showing the output voltage waveforms of the first DC/DC converter, the second DC/DC converter, and the DC/DC converter unit.

There are several possible combinations for the output voltage waveforms of the first DC/DC converter 111 and the second DC/DC converter 112. A first possible combination for the output voltage waveforms of the first DC/DC converter 111 and the second DC/DC converter 112 is that the first output DC voltage Vd1 of the first DC/DC converter 111 and the second output DC voltage Vd2 of the second DC/DC converter 112 are both full-wave rectified DC voltage having the same waveform, in which the sum of the voltage levels of these full-wave rectified DC voltages is equal to the voltage level of the output DC voltage Vd of the DC/DC converter unit 11. A second possible combination for the output voltage waveforms of the first DC/DC converter 111 and the second DC/DC converter 112 is that the waveform of the output voltage Vd1 of the first DC/DC converter 111 is a quasi half-wave rectified DC voltage waveform and the waveform of the output voltage Vd2 of the second DC/DC converter 112 is a trapezoid waveform, as shown in FIG. 8(A). A third possible combination for the output voltage waveforms of the first DC/DC converter 111 and the second DC/DC converter 112 is that the waveform of the output voltage Vd1 of the first DC/DC converter 111 is a composite of a sawtooth waveform and a quasi half-wave rectified DC voltage waveform and the waveform of the output voltage Vd2 of the second DC/DC converter 112 is a square waveform, as shown in FIG. 8(B).

Referring to FIG. 4 and FIG. 8(A), now the advantages of the inventive uninterruptible power supply are to be illustrated with reference to the circuitry of FIG. 4 and the voltage waveforms of FIG. 8(A). Assuming that the voltage of the battery pack 10 shown in FIG. 2 is half of the voltage peak of the output voltage Vd of the DC/DC converter unit 11. Because the output terminal of the first DC/DC converter 111 and the output terminal of the second DC/DC converter 112 are connected in series, the output current of the first DC/DC converter 111 and the output current of the second DC/DC converter 112 are both equal to the load current. Therefore, the ratio between output power of the first DC/DC converter 111 and the output power of the second DC/DC converter 112 can be evaluated by comparing the area designated by the waveform of the first output DC voltage Vd1 above the temporal axis and the area designated by the waveform of the second output DC voltage Vd2 above the temporal axis. It is obvious from the voltage waveforms shown in FIG. 8(A) that the output power of the first DC/DC converter 111 accounts for more than sixty percents of the total output power of the DC/DC converter unit 11, and the output power of the second DC/DC converter 112 accounts for less than forty percents of the total output power of the DC/DC converter unit 11. In this way, the transformer within the DC/DC converter unit 11 can be greatly downsized. Besides, the second DC/DC converter 112 does not carry out chopping operation by its internal switch device within the time period of t1 to t3. Therefore, the second DC/DC converter 112 will not cause any switching loss. Furthermore, the output power of the second DC/DC converter 112 within the time period of t1 to t3 accounts for more than fifty percents of the total output power of the DC/DC converter unit 11. This would greatly reduce the power loss generated in the DC/DC converter unit 11.

It can be known from the above statements that the distribution of the output voltage and the output power between the first DC/DC converter 111 and the second DC/DC converter 112 is quite flexible. Therefore, the switching regulation of the DC/DC converter unit 11 can be accomplished with a variety of control mechanisms. For example, when the output voltage Vd of the DC/DC converter 11 is smaller than a specific value, one of the first DC/DC converter 111 and the second DC/DC converter 112, for example, the first DC/DC converter 111, is fully responsible for the provision of the output voltage Vd of the DC/DC converter 11. In this way, the other DC/DC converter does not generate any switching loss for the duration, and thereby the power conversion efficiency of the DC/DC converter unit 11 can be enhanced. When the output voltage Vd of the DC/DC converter 11 is equal to or larger than the specific value, one of the first DC/DC converter 111 and the second DC/DC converter 112 performs switching regulation with a fixed duty cycle and the other DC/DC converter performs switching regulation to provide compensation for the waveform of the output voltage, such that the DC/DC converter unit 11 can provide a desired full-wave rectified DC voltage. That is, during the whole period of the output voltage, one of the DC/DC converters is configured to perform high-frequency switching regulation with a variable duty cycle and the other DC/DC converter is configured to perform switching regulation with a fixed duty cycle.

Figure 8B:
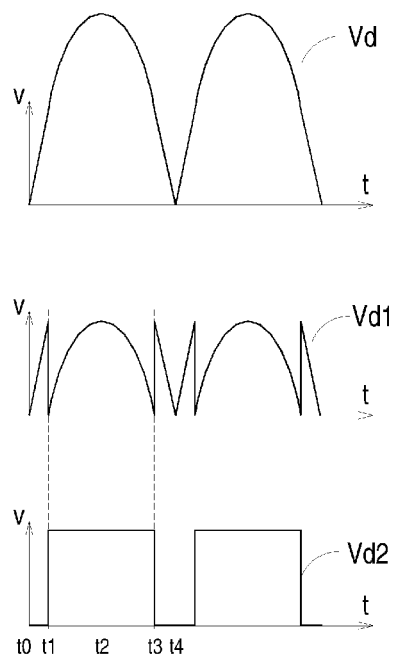
FIG. 8(B) is a timing diagram showing the output voltage waveforms of the first DC/DC converter, the second DC/DC converter, and the DC/DC converter unit.

Referring to FIG. 4 and FIG. 8(B), now the control mechanism for the switch regulation of the foregoing DC/DC converter unit 11 is to be illustrated with reference to the circuitry of FIG. 4 and the voltage waveforms of FIG. 8(B). In this example, the switch device 421 of the second DC/DC converter 112 is limited to perform low-frequency chopping only, so that the switching loss of the switch device 421 can be ignored. Meanwhile, the requirement on the high-frequency characteristic of the switch device 421 is lowered. In the time period of t0 to t1 and in the time period of t3 to t4, the second DC/DC converter 112 is configured to perform switching regulation with a fixed duty cycle (which is equal to 0) and the first DC/DC converter 111 is fully responsible for the provision of the output voltage Vd of the DC/DC converter unit 11. In the time period of t1 to t3, the second DC/DC converter 112 is configured to perform switching regulation with a fixed duty cycle (which is equal to 1) and the first DC/DC converter 111 is configured to perform switching regulation with a variable duty cycle, thereby providing waveform compensation to the output voltage Vd of the DC/DC converter unit 11.

An alternative for the control mechanism for the switching regulation of the DC/DC converter unit 11 is described as follows. When the output voltage Vd of the DC/DC converter unit 11 is smaller than a specific value, one of the first DC/DC converter 111 and the second DC/DC converter 112 is fully responsible for the provision of the output voltage Vd of the DC/DC converter 11. When the output voltage of this DC/DC converter reaches a maximum output voltage, this DC/DC converter holds its output voltage as the maximum output voltage and the other DC/DC converter start operating to provide waveform control for the output voltage Vd of the DC/DC converter 11. That is, during the whole period of the output voltage, both of the first DC/DC converter 111 and the second DC/DC converter 112 are configured to perform high-frequency switching regulation with a variable duty cycle. Such control mechanism can be better understood with reference to the diagram of FIG. 8(A).

The foregoing control mechanism is advantageous by using a single controller to control all the DC/DC converters within the DC/DC converter unit 11. Thus, it can ensure that a minimum number of converters are operating at any time. By this control mechanism, the switching loss generated in the DC/DC converter unit 11 can be reduced, and the power conversion efficiency of the DC/DC converter unit 11 can be improved.

Figure 5:
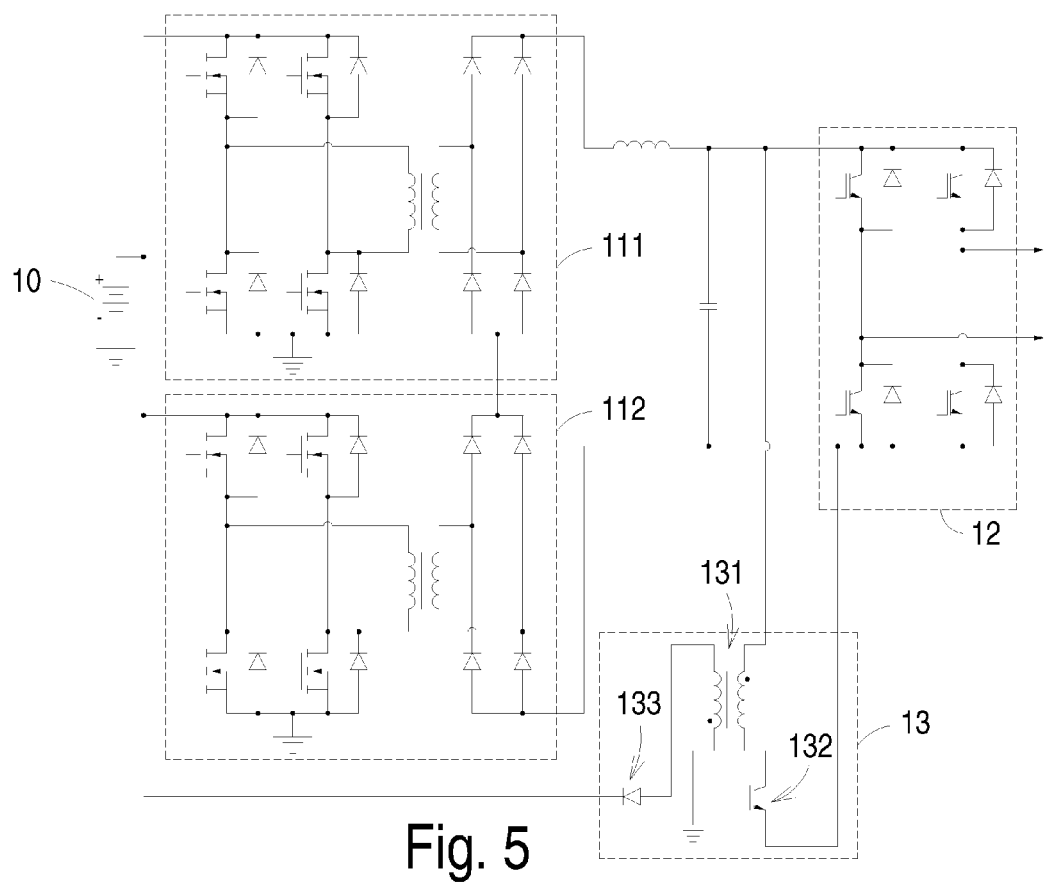
FIG. 5 is a circuit diagram showing the DC/DC converter unit, the inverter, and the energy recycle converter within the uninterruptible power supply according to a second preferred embodiment of the present invention.

It should be noted that the second DC/DC converter 112 can be implemented by a non-isolated DC/DC converter, for example, a buck converter, a boost converter, a buck-boost converter, or a cuk converter. Besides, the second DC/DC converter 112 also can be implemented by an isolated DC/DC converter, for example, a current-fed half-bridge DC/DC converter, a current-fed full-bridge DC/DC converter, a current-fed push-pull DC/DC converter, a forward converter, or a flyback converter. As shown in FIG. 5, the second DC/DC converter 112 is implemented by a full-bridge DC/DC converter according to a second preferred embodiment of the present invention.

Figure 6:
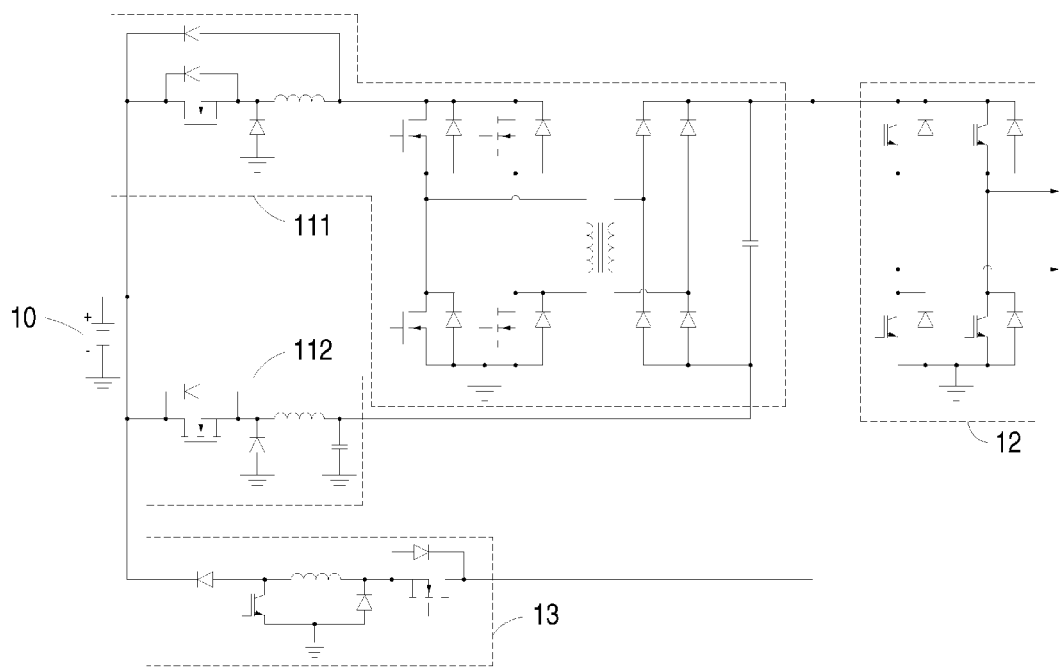
FIG. 6 is a circuit diagram showing the DC/DC converter unit, the inverter, and the energy recycle converter within the uninterruptible power supply according to a third preferred embodiment of the present invention.

In FIG. 4, the DC/DC converter unit 11 is made up of a first DC/DC converter 111 and a second DC/DC converter 112, and the voltage input terminals of the first DC/DC converter 111 and the second DC/DC converter 112 are connected in parallel and the voltage output terminals of the first DC/DC converter 111 and the second DC/DC converter 112 are connected in series. Such configuration is advantageous in terms of the reduction of the voltage stress on the output terminals of the DC/DC converter unit 11. Referring to FIG. 6, the circuitry of the DC/DC converter unit 11, the inverter and the energy recycle converter according to a third preferred embodiment of the present invention is illustrated. In FIG. 6, the first DC/DC converter 111 is implemented by a buck current-fed full-bridge DC-DC converter and the second DC/DC converter 112 is implemented by a buck converter. In the case that a single current-fed DC/DC converter is used to implement the DC/DC converter unit 11 and the inverter outputs a 220-V AC voltage, the rectifying circuit placed at the secondary side of the transformer within the current-fed DC/DC converter will bear a voltage stress with a magnitude of at least 311V, which is equal to the peak of the output AC voltage. In practical condition, the voltage stress applied to the rectifying circuit would be larger. If the topology of the DC/DC converter 11 is implemented in compliance with the present invention by using two DC/DC converters, both of the peaks of the output voltages provided by the DC/DC converter can be 155.5V. In this way, the voltage stress borne by the rectifying diodes placed at the secondary side of the transformer can be reduced. Also, the power loss generated in the DC/DC converter unit 11 can be reduced as well.

The energy recycle converter 13 is configured to recycle the redundant energy of the uninterruptible power supply 100 to the battery pack 10. Assuming the output terminals of the uninterruptible power supply 100 are connected to a light load and the light load is a resistive load. As shown in FIG. 4, the discharging characteristic of the output capacitor located at the output terminal of the DC/DC converter unit 11 causes the voltage waveform of the output capacitor to be inconsistent with the given waveform of the full-wave rectified DC voltage Vd, even if the DC/DC converter unit 11 does not provide any energy to the output capacitor. Therefore, the minimum value of the output voltage Vd of the DC/DC converter unit 11 can not be zero. Assuming the uninterruptible power supply 100 is powering an inductive load, the output current may flow in a reverse direction to the inverter 12 due to the inconsistency between the phase of the output voltage and the phase of the output current of the uninterruptible power supply 100 while the output voltage is changing its phase. In the meantime, even if the DC/DC converter unit 11 does not provide any energy to the output capacitor, the voltage across the output capacitor will increase due to the reverse flow of the inductive current to the inverter 12, thereby changing the waveform of the output voltage Vd of the DC/DC converter unit 11. In these examples, the voltage across the output capacitor located at the output terminal of the DC/DC converter unit 11 will be equal to a full-wave rectified DC voltage plus a superimposed DC voltage indicative of the redundant energy of the uninterruptible power supply 100. In order to prevent the idleness of energy and provide a high-quality output voltage, the uninterruptible power supply 100 of the present invention uses an energy recycle converter 13 to recycle the redundant energy for charging the battery pack 10.

It can be known from the analysis that the redundant energy caused by the light load is generated in the trailing edge of the full-wave rectified DC voltage Vd outputted from the DC/DC converter unit 11, for example, within the time period of t2 to t4 shown in the timing diagram of FIG. 8(A). In addition, the redundant energy caused by the inductive load is generated in the rising edge of the full-wave rectified DC voltage Vd, for example, within the time period of t0 to t4 shown in the timing diagram of FIG. 8(A).

In the preferred embodiment of the present invention, the energy recycle converter 13 is implemented by a buck-boost converter, as shown in FIG. 4 and FIG. 6. Now, the scheme of FIG. 6 is to be taken as an example to illustrate the principle of the energy recycle converter 13. If the digital controller 14 of FIG. 2 detects that there exists redundant energy to be recycled, the transient value of the output voltage of the DC/DC converter unit 11 will be sensed. If the sensed transient value is higher than the battery voltage, the energy recycle converter 13 will be activated in buck mode. Otherwise, the energy recycle converter 13 will be activated in boost mode to transfer the redundant energy from the output terminal of the DC/DC converter unit 11 to the battery pack 10.

Besides, the energy recycle converter 13 can be used as a battery charger for the battery pack 10. When the commercial power source is normally operating and the battery pack 10 needs to be charged, the inverter 12 functions as an unregulated rectifying bridge circuit and thereby generating a fixed DC voltage at the output terminal of the DC/DC converter unit 11. This DC voltage can be used to charge the battery pack 10 through the energy recycle converter 13 under the buck mode.

Figure 7:
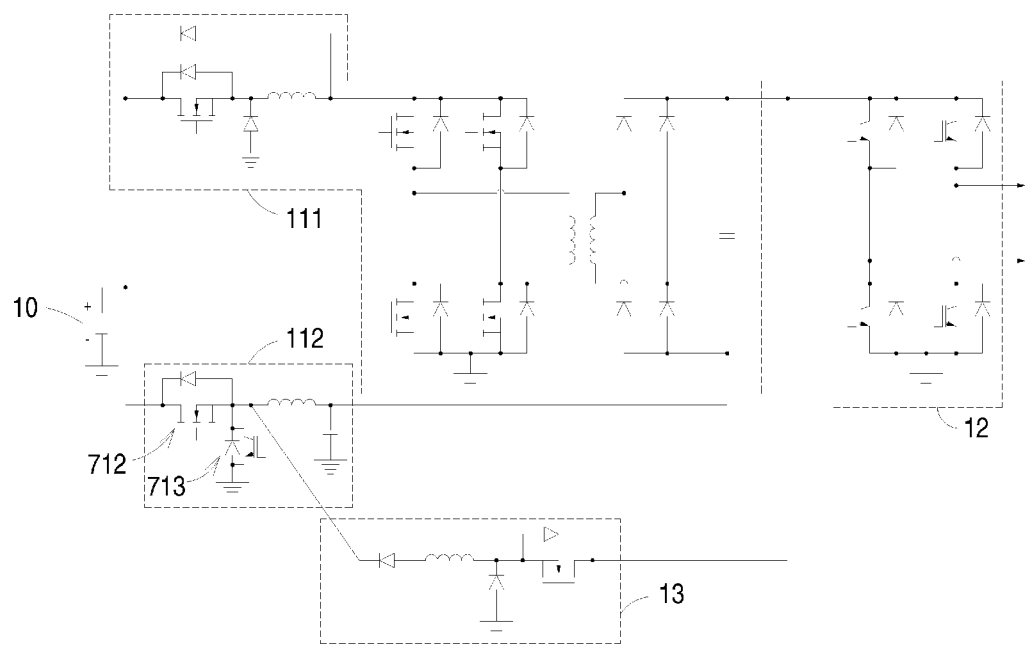
FIG. 7 is a modified topology of the DC/DC converter unit, the inverter, and the energy recycle converter within the UPS according to the present invention.

FIG. 7 shows a modified topology of the DC/DC converter unit, the inverter, and the energy recycle converter within the uninterruptible power supply according to the present invention, in which a portion of the energy recycle converter 13 is incorporated into the second DC/DC converter 112. In this case, the second DC/DC converter 112 is implemented by a buck converter and the energy recycle converter 13 is implemented by a buck-boost converter, in which the energy recycle converter 13 is connected between the input terminals of the inverter 12 and the second DC/DC converter 112. The second DC/DC converter 112 extraordinarily includes an additional transistor switch 713 which is located between the source terminal of the MOSFET switch 712 and ground and implemented with a bipolar junction transistor. Also, the output terminal of the energy recycle converter 13 is connected between the MOSFET switch 712 and the output terminal of the second DC/DC converter 112. Thus, the second DC/DC converter 112 can function as a synchronous rectifying circuit for automatically recycling the redundant energy remained on the output capacitor of the second DC/DC converter 112. In the meantime, the additional transistor switch 713 can function as a switch device for the energy recycle converter 13 while the energy recycle converter 13 is working under boost mode.

It is to be noted that the energy recycle converter 13 can be implemented by any DC/DC converter topology. As shown in FIG. 5, the energy recycle converter 13 is implemented by a flyback converter including a transformer 131, a transistor switch 132 connected to the primary side of the transformer 131, and a rectifying diode 133 connected to the secondary side of the transformer 131. The primary side of the transformer 131 is configured to store the redundant energy of the uninterruptible power supply 100 while the transistor switch 1132 is turned on and release the stored energy to the secondary side of the transformer 131 while the transistor switch 132 is turned off, so as to charge the battery pack 10 through the rectifying diode 133.

In order to fulfill the foregoing circuit operations, the digital controller 14 is configured to detect the output voltage Vd of the DC/DC converter unit 11 and compare the output voltage Vd with a reference voltage, so that the digital controller 14 can output pulse-width-modulation (PWM) signals based on the results of the comparison to control the on/off operations of the DC/DC converter unit 11, the inverter 12, and the energy recycle converter 13.

In conclusion, the present invention proposes an uninterruptible power supply for providing a sinusoidal-wave output AC voltage to a load when the commercial power source is abnormal or interrupted. The inventive uninterruptible power supply is characteristic in terms of the internal DC/DC converter unit that is made up of a first DC/DC converter and a second DC/DC converter, in which the voltage input terminals of the first DC/DC converter and the second DC/DC converter are connected in parallel and then connected to a battery pack and the voltage output terminals of the first DC/DC converter and the second DC/DC converter are connected in series and then connected to an inverter. By using a digital controller to control the switching regulation of the DC/DC converters, the first DC/DC converter and the second DC/DC converter can respectively output a first output DC voltage and a second output DC voltage. Moreover, the first output DC voltage and the second output DC voltage can be summed up to form a full-wave rectified DC voltage because of the serial connection of the voltage output terminals of the first DC/DC converter and the second DC/DC converter. Thus, the inverter can convert the full-wave rectified DC voltage provided by the DC/DC converter unit into a sinusoidal-wave output AC voltage. Besides, the ratio between the output power of the first DC/DC converter and the output power of the second DC/DC converter and the total output power of the DC/DC converter unit can be flexibly regulated, and circuitry of the first DC/DC converter and the circuitry of the second DC/DC converter can be designed depending on the needs arisen from practical applications. Therefore, the switching loss generated in the DC/DC converter unit can be dramatically reduced and the power conversion efficiency of the DC/DC converter unit can be dramatically enhanced. Besides, the inventive uninterruptible power supply includes an energy recycle converter which can be used to recycle the redundant energy of the uninterruptible power supply to the battery pack or functions as a battery charger for the battery pack.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An uninterruptible power supply for providing a sinusoidal-wave output AC voltage, comprising:
    a battery pack;
    a DC/DC converter unit coupled to the battery pack for converting a DC voltage provided by the battery pack into a full-wave rectified DC voltage; and
    an inverter coupled to the DC/DC converter unit for converting the full-wave rectified DC voltage into a sinusoidal-wave output AC voltage;
    wherein the DC/DC converter unit comprises a plurality of DC/DC converters having a plurality of input terminals and output terminals, and wherein the plurality of input terminals of the plurality of DC/DC converters are connected in parallel to the battery pack and the plurality of output terminals of the plurality of DC/DC converters are connected in series to the inverter, and wherein each DC/DC converter is configured to convert the DC voltage provided by the battery pack into an output voltage such that the output voltages of the plurality of DC/DC converters are summed up to form the full-wave rectified DC voltage;
    wherein the plurality of DC/DC converters include a first DC/DC converter and a second DC/DC converter, wherein one of the first DC/DC converter and the second DC/DC converter is configured to perform switching regulation with a variable duty cycle and the other DC/DC converter is configured to perform switching regulation with a fixed duty cycle, and wherein the first DC/DC converter is an isolated DC/DC converter which has a transformer and the second DC/DC converter is a non-isolated converter.

2. The uninterruptible power supply according to claim 1 further comprising an energy recycle converter coupled between an output terminal of the DC/DC converter unit and the battery pack and configured to recycle the redundant energy of the uninterruptible power supply to the battery pack.

3. The uninterruptible power supply according to claim 2 wherein the energy recycle converter is a DC/DC converter.

4. The uninterruptible power supply according to claim 3 wherein energy recycle converter is configured to charge the battery pack while the uninterruptible power supply is powered by a commercial power supply.

5. The uninterruptible power supply according to claim 4 further comprising a controller for comparing the full-wave rectified DC voltage provided by the DC/DC converter unit with a reference voltage, and in response to the comparison results controlling the switching operations of the DC/DC converter, the inverter and the energy recycle converter.

6. The uninterruptible power supply according to claim 2 further comprising an energy recycle converter coupled to an input terminal of the inverter and configured to recycle the redundant energy of the uninterruptible power supply to the battery pack.

7. The uninterruptible power supply according to claim 6 wherein energy recycle converter is configured to charge the battery pack while the uninterruptible power supply is powered by a commercial power supply.

8. The uninterruptible power supply according to claim 7 further comprising a digital controller for comparing the full-wave rectified DC voltage provided by the DC/DC converter unit with a reference voltage, and in response to the comparison results controlling the switching operations of the DC/DC converter, the inverter and the energy recycle converter.

9. A method for enabling an uninterruptible power supply to provide a sinusoidal-wave output AC voltage, comprising the steps of:
    providing a battery pack, a DC/DC converter unit and an inverter, wherein the DC/DC converter unit comprises a plurality of DC/DC converters, wherein the plurality of DC/DC converters comprise a first DC/DC converter and a second DC/DC converter, wherein the first DC/DC converter is configured to convert the battery voltage into a DC voltage by a first switching regulation mechanism and the second DC/DC converter is configured to convert the battery voltage into a DC voltage by a second switching regulation mechanism, wherein the first switching regulation mechanism is achieved with a variable duty cycle and the second switching regulation mechanism is achieved with a fixed duty cycle, and wherein the first DC/DC converter is an isolated DC/DC converter which has a transformer and the second DC/DC converter is a non-isolated converter;
    providing a battery voltage to the DC/DC converter unit by the battery pack;
    converting the battery voltage into a plurality of DC voltages by the plurality of DC/DC converters;
    summing the plurality of DC voltages to a full-wave rectified DC voltage; and
    converting the full-wave rectified DC voltage into a sinusoidal-wave output AC voltage by the inverter.

10. The method according to claim 9 further comprising the steps of:
    providing an energy recycle converter; and
    recycling the redundant energy of the uninterruptible power supply to the battery pack by the energy recycle converter.

* * * * *